(12) United States Patent
Wroe

(10) Patent No.: US 6,172,346 B1
(45) Date of Patent: *Jan. 9, 2001

(54) METHOD OF PROCESSING CERAMIC MATERIALS AND A MICROWAVE FURNACE THEREFORE

(75) Inventor: Fiona Catherine Ruth Wroe, Sandbach (GB)

(73) Assignee: EA Technology Limited, Chester (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/591,594
(22) PCT Filed: Aug. 8, 1994
(86) PCT No.: PCT/GB94/01730
  § 371 Date: May 22, 1996
  § 102(e) Date: May 22, 1996
(87) PCT Pub. No.: WO95/05058
  PCT Pub. Date: Feb. 16, 1995

(30) Foreign Application Priority Data

Aug. 10, 1993 (GB) .................................................. 9316616

(51) Int. Cl.[7] .................................................. H05B 6/68
(52) U.S. Cl. .................... 219/681; 219/685; 219/700; 219/715; 219/718
(58) Field of Search ..................................... 219/685, 681, 219/682, 683, 684, 698, 700, 702, 715, 718

(56) References Cited

U.S. PATENT DOCUMENTS 3,569,656 * 3/1971 White .................................... 219/718
4,278,862 * 7/1981 Mizuno et al. ...................... 219/683

(List continued on next page.)

FOREIGN PATENT DOCUMENTS 0 213 442 A1 6/1986 (EP) .
0 500 252 A1 8/1992 (EP) .

(List continued on next page.)

OTHER PUBLICATIONS

"The Development of New Microwave Heating Applications at Ontario Hydro's Research Division", Steven J. Oda et al., Mat. Res. Soc. Symp. Proc. vol. 189, 1991, pp. 391–403.

"Microwave–Resistance Heating for Advanced Ceramic Processing Phase II: Optimization and Application", Ontario Hydro Research Division, Sep. 1992, pp. iii–xi and 1–43 and A–1–A–29 and B–1B–23.

* cited by examiner

Primary Examiner—Philip H. Leung
(74) Attorney, Agent, or Firm—Westman, Champlin & Kelly, P.A.

(57) ABSTRACT

A microwave furnace (10) of the type comprising a microwave source (14), coupled to an enclosure for the confinement of microwaves and for containing an object to be heated (12). An independently controllable alternate heating (20) is disposed in relation to the enclosure (12) to provide at least one of radiant and convective heating within the enclosure. The method comprises the steps of energizing the alternate heater (20) so as to generate heat substantially throughout the heating cycle of the furnace (10) and controlling the quanity of heat generated in the object y one or both of the microwaves and the alternate heater so as to provide a desired thermal profile in the object. A temperature sensor to measure the ambient temperature within the enclosure (12) can be provided and control circuit (54) responsive to the sensed temperature controls the quanity of heat generated in the object by the microwaves and the alternate heat so as to provide a desired thermal profile within the object.

20 Claims, 5 Drawing Sheets

U.S. PATENT DOCUMENTS

| | | | |
|---|---|---|---|
| 4,307,277 | 12/1981 | Maeda et al. | 219/10.55 |
| 4,345,134 | 8/1982 | Tanaka et al. | 219/10.55 |
| 4,463,238 * | 7/1984 | Tanabe | 219/685 |
| 4,469,926 * | 9/1984 | Komuro | 219/681 |
| 4,831,227 * | 5/1989 | Eke | 219/681 |
| 4,876,426 * | 10/1989 | Smith | 219/681 |
| 4,880,578 | 11/1989 | Holcombe et al. | 264/26 |
| 4,963,709 | 10/1990 | Kimrey, Jr. | 219/10.55 |
| 5,166,484 * | 11/1992 | Young et al. | 219/681 |
| 5,227,600 | 7/1993 | Blake et al. | 219/10.55 |

FOREIGN PATENT DOCUMENTS

| | | |
|---|---|---|
| 2 132 745 | 2/1986 | (GB) . |
| 2 227 397 | 7/1990 | (GB) . |
| 2 262 333 | 6/1993 | (GB) . |
| 2 263 976 | 8/1993 | (GB) . |
| 3-67489 | 3/1991 | (JP) . |

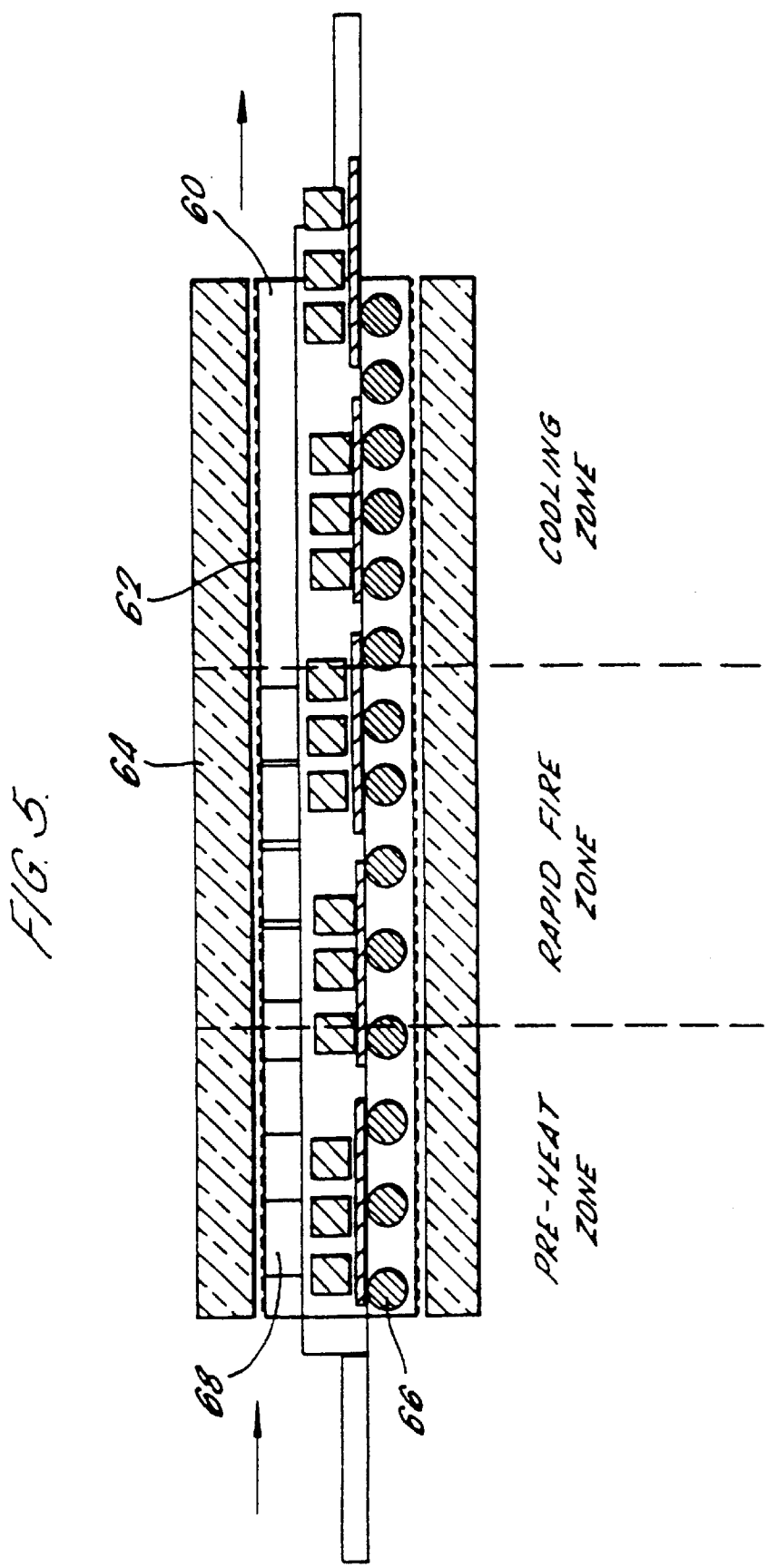

METHOD OF PROCESSING CERAMIC MATERIALS AND A MICROWAVE FURNACE THEREFORE

INTRODUCTION

The present invention relates to the microwave-assisted processing of ceramic materials. To that end there is described a microwave furnace and a method of operating a microwave source, an enclosure for the confinement of the microwave and for containing an object to be heated, means for coupling the microwave source to the enclosure and independently controllable alternate heating means disposed in relation to the enclosure to provide at least one of radiant and convective heating within the enclosure.

The volumetric heating of ceramic materials using microwaves can in principle be used to overcome many of the difficulties associated with the inherently poor heat transfer characteristics of ceramic components and certain glasses such as dark colored glass or glass ceramics. The following will therefore primarily concentrate on ceramic materials and components, however it will be appreciated that the teaching provided is also applicable to any material which requires heating and exhibits a low thermal conductivity, or because the rate determining factor in the heating of a material will be one of mass transfer, a low diffusivity.

Problems Associated With the Conventional Firing of Ceramics and Glass

In the sintering of ceramics, high temperatures are necessary to overcome the activation energy barrier for the various mass transfer processes involved in the reduction in the particle surface area. In general the rate of mass transfer is dependant on the sintering temperature, with higher temperatures giving rise to more rapid densification. In glass and glass-ceramics the main limitation is also one of mass transfer, as the infra-red radiation cannot significantly penetrate the surface of the glass, particularly if the glass is colored.

In a conventional furnace, heat transfer is predominantly by radiation to the surface of the component followed by conduction from the surface to the center. During sintering the high radiant loading required to accomplish the task in a fixed time period results in the temperature gradient across the specimen, which is determined primarily by the thermal conductivity, becoming steep with the surface at a much higher temperature than the center. Since the thermal conductivity of a typical unsintered homogeneous material is extremely low (i.e. less than 1W/mK), there is a tendency in larger components for the temperature gradient to result in a large thermal mismatch between the centre and the surface. This in turn leads to the development of a stress at the surface of the component which is proportional both to $E_{eff}$, the effective Young's Modulus, and the thermal expansion co-efficient, a which for ceramics is typically of the order of $8 \times 10^{-6} K^{-1}$.

During the first stages of heating, if the component is heated uniformly on all sides, the described thermal mismatch generates compressive thermal stresses at the surface, and as a result the propagation of cracks is inhibited and failures are comparatively rare. However if the thermal gradient is sufficiently large, cracking will occur. Unfortunately it has been found that this maximum temperature gradient varies with both the material and temperature making it difficult to predict and necessitating extensive trials to determine the optimum firing schedule for each component and material composition.

Where the radiant heating is non-uniform, for example, if the components are stacked or the subject of multiple firing, one side of the component will be in tension and prone to crack propagation. In extreme cases catastrophic fracture can occur while in less severe cases the stresses may still cause distortion of the components.

Whether the heating is either uniform or non-uniform, once the sintering regime is reached, the linear shrinkage associated with the densification process tends to over shadow the thermal mismatch and allow some relaxation of the thermal stresses with the consequence that the stress distribution becomes more complicated to predict.

The problem of poor heat transfer is accentuated still further with fast firing. In many cases it is preferable to 'fast fire' a ceramic in order to promote better energy efficiency and allow greater throughput of components. At the same time by fast firing it is also possible to achieve an improved fine-grained microstructure as it has been found that slower heating rates tend to give rise to a coarser grain size and a deterioration in mechanical strength since the larger grains act as flaws. However, in order to rapidly fire a component in a short time period it is necessary to use high radiant surface loadings and this in turn provides the heating elements with a difficult role to perform and shortens their life expectancy considerably necessitating the use of higher rated and more expensive elements. At the same time it also promotes temperature gradients within the components as the heat conduction is typically slow.

The presence of a severe temperature gradient, apart from causing cracking, can also result in uneven sintering, with the surface sintering before, and at a faster rate than the centre. This can result in non-uniform properties within the material, which can make a predetermined quality specification difficult to meet and can lead to the generation of a lot of waste material, particularly if the final component is to be machined from a larger block. It can also prevent the escape of binders and other volatile species.

Furthermore, in the firing of ceramics, it is not uncommon to encounter major crystallographic phase transformations which can also be accompanied by volume changes. For example, in the firing of quartz-containing clay bodies for use as tableware, the inversion of $\alpha/\beta$ quartz requires a uniform temperature profile throughout the component. This requires specific firing schedules which for the above reasons are clearly difficult to attain and so restricts the design of the components.

In summary therefore the theoretical limits of conventional heating techniques impose relatively modest heating rates on components having anything other than a small cross-section. Consequently in some parts of the ceramic industry, firing schedules lasting over 2 weeks are used for large components and, as a result, extremely large tunnel-style kiln systems have to be used in order to achieve the required throughput. This makes the firing process not only energy intensive, which naturally tends to favor non-electrical methods of heating, but also highly capital and labor intensive. These factors all contribute to slow the uptake of new processes and products which involve the sintering of ceramics since at the same time these processes and products significantly lower the net value to the company of the project concerned.

Problems Associated With the Microwave-Only Firing of Ceramics and Glass

In the past microwave processing has been suggested as an alternative to conventional radiant furnaces in an attempt to address the problems outlined above. The principal benefit offered by microwave processing is that by depositing energy directly within the component it is possible to overcome the problems of heat transfer within individual components and throughout the furnace.

The benefits of so called volumetric heating techniques have long been recognised in other industries. For example, it is known to use RF in drying processes and to use lower frequencies in the heat treatment and melting of metals. However ceramics, being principally non-conductive, require the use of the much higher frequencies of the microwave band before effective coupling can be achieved. Attempts have been made to heat ceramics at microwave frequencies of between 900 MHz and 30 GHz and it has been found that many materials will couple quite efficiently at these frequencies. Consequently microwave heating has been cited as a way in which temperature uniformity can be improved within a material.

In theory, by depositing the energy directly within the component the problems of heat transfer throughout individual components and throughout the furnace should be able to be overcome. This in turn should lead to a more uniform product and allow faster, and more energy efficient processing. Other benefits include a possible lowering of the sintering temperature by as much as 200° C. with a corresponding improvement in energy efficiency.

However, despite these claims, recent developments have highlighted a number of potentially serious drawbacks to microwave-only firing which have been identified as the cause of numerous failed attempts to fire realistically sized components. This in turn has led to significant scepticism within the ceramic industry as to the value of microwave firing.

In theory, a material in a sufficiently uniform electromagnetic field can be heated evenly and quickly. In practice, however, difficulties arise when heating a body to high temperature using only microwave energy and these often result in thermal stress fractures. As the temperature of the body rises, heat is lost to the surroundings, which causes an inverted parabolic temperature distribution to be generated across the component. As the temperature of the body increases, the heat losses become greater, and the magnitude of this temperature difference increases.

Although it is possible to generate extremely high field intensities within carefully tuned resonant chambers, the multi-mode cavity more realistically used for large scale processing is usually limited to a Q factor of less than 200.

Many ceramics, such as alumina, exhibit relatively small losses, i.e. they have relatively poor microwave absorption characteristics, at low to intermediate temperatures and so do not heat quickly in the field strengths of a typical multi-mode cavity. However as they approach a critical temperature, the losses increase dramatically and an effect known as thermal break-away can occur. As this happens the Q factor of the cavity will fall, and less energy will be absorbed by other parts within the cavity. This effect is self propagating as those areas which are hotter will preferentially absorb microwave energy, and in extreme cases can cause internal melting, while other cooler regions remain at ambient temperature. Thus many such microwave-only heating arrangements can be considered as intrinsically self-destructive.

A number of driving forces capable of generating the first stages of thermal break-away in a material capable of exhibiting pronounced non-linear absorption behavior have been identified as:

a) Non-uniformity of the electromagnetic field distribution;

b) Heterogeneous properties of the material; and c) Heat losses from the surface of the component.

The first of these has long been recognised as a major cause of thermal break-away or the generation of hot-spots in situations where the skin depth is larger than the typical thickness of the material concerned. Consequently various solutions have been tried to improve the uniformity of the field.

Essentially an incoming electromagnetic wave interacts with the contents of the cavity and is reflected, and to some extent attenuated, by the cavity walls. This in turn leads to the formation of a standing wave pattern with characteristic peaks and troughs. Since the wavelength of microwave radiation is typically large compared to the dimensions of the cavity or at least of the same order (i.e. between 0.12 m and 0.30 m in length) only relatively few modes can exist in a reasonably sized enclosure. Attempts have been made to improve the uniformity of cavities by making their dimensions as much as 100 times greater than the wavelength of the microwaves that are used but this is really only possible at very high frequencies of approximately 30 GHz. The use of this frequency for commercial applications however is impractical owing to the associated high capital cost and other factors such as the more limited microwave penetration.

Other methods of improving the uniformity of an electromagnetic field within a microwave cavity include the use of mode stirrers, multiple magnetrons and turn-tables. Mode stirrers effectively act as an antenna and their constant motion continually changes the standing wave pattern within the cavity such that a particular point in space sees an average field strength. The use of multiple magnetrons on the other hand helps to produce a more complicated interaction and provide an improved uniformity. One of the most effective solutions however is the turn-table. By continually moving the material to be heated within the electromagnetic field the standing wave pattern and the field strength encountered by the component constantly changes. In practice the use of some or all of these techniques should ensure that a reasonable field uniformity is achieved.

The second factor identified as leading to thermal break-away is that ceramic materials are essentially heterogeneous materials and frequently contain large amounts of glass. As a result the different materials within a single component have varying loss factors, and varying loss factor behavior with temperature.

The third factor identified as leading to thermal break-away can be related to the fact that the absorption of microwave energy is no longer uniform once temperature differences have been established, particularly in cases where the loss factor, which controls the amount of power absorbed by the material, increases exponentially with temperature. In these circumstances the hotter centre of the component will begin to absorb a greater proportion of the microwave power than the surface and the magnitude of the temperature gradient will increase still further. Experiments have shown that in severe examples temperature variations of several hundred degrees can occur in components of even relatively small dimensions. Under these circumstances it is simply not possible for the heat to be transferred to the surface of the component sufficiently quickly in order to prevent thermal break-away.

Hybrid Microwave Furnaces of the Prior Art

One problem that is closely related to thermal break-away is that not all materials are able to efficiently absorb microwave energy at ambient temperatures and must first be heated to a more elevated temperature. The raising of the material to this more elevated temperature using microwave heating can be a time consuming and inefficient process since to start off with it is characterised by a long dwell period in which only a small rise in temperature is evident.

In the past attempts have been made to overcome the problems associated with the poor susceptibility to microwaves of many materials at ambient temperatures by heating the materials concerned using a combination of microwave and resistive heating techniques. By first heating a material using conventional techniques until it reached a temperature at which microwave heating could take over it was hoped to achieve a far more efficient method of overall heating.

To date however, these attempts have been limited to the laboratory and have comprised the placement of a microwave cavity constructed from austenitic stainless steel within a conventional electric resistance furnace. Claims have been made relating to this furnace's ability to conventionally pre-heat components to the point where they can be self heated using microwaves at which point the conventional heating is stopped and the microwaves are switched on. Due to the limitations of the cavity material however, it is doubtful whether pre-heating can be taken beyond 1000° C. Furthermore, the requirement for extensive insulation material to be placed around the components to prevent the austenitic stainless steel from overheating makes the process very cumbersome.

Other attempts to provide both microwave and radiant heating within the same furnace environment have involved the use of microwave susceptors which, when in operation, are capable of radiating heat to the sample to be heated. However, these attempts have also suffered from certain drawbacks. In the first place, the use of susceptors does not permit full control of the proportion of heat absorbed by the susceptors, insulation materials and specimens as would be required on an industrial scale. There are also problems in maintaining a uniform temperature distribution in a purely microwave heated system under steady state conditions. During a hold cycle, for example, the components will continue to absorb microwave power which must then be dissipated to the surroundings. As a result a temperature gradient will be set up within the components, the magnitude of which will depend on the component size and its physical properties.

SUMMARY OF THE PRESENT INVENTION

According to the first aspect of the present invention there is provided a method of processing ceramic materials comprising the steps of providing a microwave furnace of the type comprising a microwave source, an enclosure for the confinement of microwave energy and for containing an object to be heated, means for coupling the microwave source to said enclosure, and independently controllable alternate heating means comprising at least one of radiant and convective heating means, said alternate heating means being disposed in relation to said enclosure to provide radiant and/or convective heat within the enclosure, energizing said alternate heating means independently of the microwave energy in the enclosure so as to generate said at least one of the radiant and convective heat substantially throughout the heating cycle of the furnace and at temperatures up to and including sintering temperatures, and controlling the quantity of heat generated in the object by both of the microwave energy and said at least one of radiant and convective heat so as to provide a desired thermal profile in the object.

Advantageously the quantity of heat generated by the alternate heating means and supplied to the object to be heated may substantially balance the quantity of heat lost by the object by means of surface heat loss mechanisms. Alternatively, the quantity of heat generated by the alternate heating means and supplied to the object to be heated may be either greater or less than that required to substantially balance the quantity of heat lost by the object by means of surface heat loss mechanisms.

Advantageously, the step of controlling the quantities of heat generated in the object by the microwave energy and said at least one of the radiant and convective heat may comprise measuring the ambient temperature within the enclosure and controlling the heat generated in the object by one or both of the microwave energy and said at least one of the radiant and convective heat in response to the temperature measurement.

Advantageously the step of controlling the quantities of heat generated in the object by the microwave energy and said at least one of the radiant and convective heat may comprise determining the net quantity of microwave energy per unit time that is delivered to the enclosure and controlling the heat generated by one or both of the microwave energy and said at least one of the radiant and convective heat in response to this determination. In this respect it will be apparent to those skilled in the art that the net quantity of microwave energy per unit time may be delivered either as a constant power or as a duty cycle varying within a range of powers. It is to be noted that in this latter case however the unit of time should be selected so as to be long enough to include a number of such duty cycles whilst still being short relative to the duration of the heating cycle of the furnace.

Advantageously the desired thermal profile may be provided by adjusting the quantity of heat generated in the object by said at least one of the radiant and convective heat relative to that calculated to have been generated by the microwave energy.

A microwave furnace for processing ceramic materials comprising a microwave source, an enclosure for the confinement of microwave energy and for containing an object to be heated, means for coupling the microwave source to said enclosure, alternate heating means comprising at least one of radiant and convective heating means controllable independently of the microwave energy and disposed in relation to said enclosure to provide at least one of radiant and convective heat within the enclosure substantially throughout the heating cycle of the furnace and at temperatures up to and including sintering temperatures, and control means to control a quantity of heat generated in the object by both the microwave energy and said at least one of the radiant and convective heat so as to provide a desired thermal profile in the object.

Advantageously, the microwave furnace may additionally comprise temperature sensor means to measure the ambient temperature within the enclosure, the control means being responsive to the temperature measurement to control the quantity of heat generated in the object by one or both of the microwave energy and said at least one of the radiant and convective heat so as to provide a thermal profile in the object.

Advantageously, the microwave furnace may additionally comprise means to determine the net quantity of microwave energy per unit time delivered to the enclosure, the control means being responsive to this determination to control the quantity of heat generated in the object by one or both of the microwave energy and said at least one of the radiant and convective heat so as to provide a desired thermal profile in the object. In this regard it will be apparent to those skilled in the art that the net quantity of microwave energy per unit time may be delivered as a constant power or as a duty cycle varying within a range of powers. It is to be noted that in this latter case however the unit of time should be selected so as to be long enough to include a number of such duty cycles whilst still being short relative to the duration of the heating cycle of the furnace.

Advantageously the quantity of heat generated by said at least one of the radiant and convective heat may be controlled relative to that calculated to have been generated by the microwave energy to provide a desired thermal profile in the object.

Advantageously, the quantity of heat generated by the microwave energy may be controlled manually.

Advantageously the alternate heating means may be disposed externally of the enclosure. Alternately, the alternate heating means may be disposed internally of the enclosure. In this last arrangement the radiant heating means may comprise at least one resistive heating element that extends through a wall of the enclosure. In particular the heating element may be moveable between a first position in which the heating element extends through a wall of the enclosure and a second position in which the heating element is withdrawn from the enclosure. Alternatively, the heating element may be non-retractably mounted within the enclosure.

Advantageously the alternate heating means may comprise means for the burning of fossil fuels. In particular, the means for the burning of fossil fuels may comprise a slotted waveguide.

Advantageously, the furnace may be adapted for use with an inert, a reducing or an oxidising atmosphere.

In essence the use of uniform volumetric heating means that the thermal stresses which result from non-uniformity of temperature can be minimised. This in turn permits significantly faster firing of components and calcination of powder while faster firing not only utilises the kiln more effectively, but also reduces the cost of firing by reducing the amount of waste heat per unit fired.

One material that has been studied extensively in this regard is Alcoa alumina, grade A100SG. It has been found that the maximum heating rate obtainable using conventional or microwave-only firing (but without the use of susceptors) was 5° C. per minute. By contrast firing rates of 35° C. per minute have been achieved using microwave-assisted firing.

In addition to this, faster firing also permits improved production scheduling. At present production planning is limited in its flexibility as it is not always possible to plan to produce the exact current requirements because of the long firing times involved and the need to vary the nature and stacking of components within the kiln in order to maximise heat transfer and product throughput. As a result it has been difficult to achieve just-in-time manufacturing and large amounts of work-in-progress are required to satisfy customer requirements. Microwave-assisted firing allows the flexibility needed to achieve just-in-time manufacturing and reduce the work-in-progress, thereby improving the cash flow of a company making use of certain embodiments of the present invention.

Embodiments of the present invention can also be used to improve component design flexibility, which to date has been limited as a result of the difficulty of achieving even temperature profiles across varying cross-sections and which in turn has led to the build up of thermal stress. One example of this is in the sanitary ware industry where in the past cross-sections have been limited to less than 2 cm.

There are also environmentally-friendly aspects to the introduction of fast firing, particularly in those industries that use clay as their basic material. Clay contains significant quantities of impurities which can be emitted during firing. One example of these is fluorine. In Germany, under the T.A. Luft Act 1986 fluorine emissions are limited to a maximum of 5 mg/m$^3$ (ie. less than 0.5 kg/hr). Recent surveys in the United Kingdom show that the average fluorine emission rate from kilns firing clay products is 43 mg/m$^3$, with the maximum recorded emission being 106 mg/m$^3$. Thus less than 3% of the U.K. kilns taking part in these surveys would conform to the German regulations. Even under the less stringent U.K. regulations which set a limit on flourine emissions of 10 mg/m$^3$ and were first introduced on 1st January, 1985, only 7% of existing kilns would be regarded as acceptable.

Fluorine emissions however would be substantially reduced with the use of microwave-assisted firing for two reasons.

Firstly, the amount of fluorine released is directly related to the time the clay spends at a temperature above 800° C. The faster throughput associated with microwave-assisted firing will mean that the total time spent at these temperatures will be reduced by up to a factor of 5. Secondly, 90% of the fluorine released during the firing process is due to water remaining in the clay, and the burning of hydrogen-containing fuels. However using microwave-assisted firing, microwave energy will remove the water prior to the critical temperatures of 800° C., and since at least 25% of the energy supplied will be microwaves, the quantity of hydrogen-containing fuels that is burnt will be reduced.

The cost of capital equipment is also of prime importance when evaluating the potential benefit offered by embodiments of the present invention. In the United Kingdom, for a new process to be widely adopted the return on the capital investment should be high, and at least equal to that gained on long term high interest accounts. If the project is considered to carry significant risk, then the projected return must be greater still.

It has been demonstrated on a laboratory scale that it is possible to design and install (i.e. retrofit) microwave equipment on most existing kilns, thereby reducing the risk and capital cost involved in designing and installing a completely new kiln system based entirely on microwave-only firing.

One example of the capital cost associated with the installation of microwave equipment on an existing furnace as a microwave-assisted retrofit is as follows. A modelling and experiment exercise conducted in 1993 estimated the total amount of microwave power required to retrofit a modern gas fast firing 5,860 kw (200 therm) tunnel kiln as 5% in order to achieve uniformity of temperature and increased throughput. The cost of industrial scale microwave capital equipment in the same year was estimated to be between £1785 to £2,500 per kWh, with the higher cost associated with the lower power equipment. This corresponded to an approximate capital cost of £523,000, and yielded a pay back time of approximately 13 months, which would probably be acceptable to most users.

By contrast the equivalent capital cost associated with the installation of microwave equipment on a microwave-only kiln during the same period was in excess of £10 million. In addition, the microwave-only option would normally require new kilns to be built, further adding to this cost.

It can therefore be seen that microwave-assisted firing is an economically viable microwave firing option. This is also true of microwave drying where microwave energy is usually used in combination with a conventional form of heat energy to remove the last few percentages of moisture from a material at a much reduced capital cost.

In addition there are many applications where it would be advantageous to control the temperature profile within specified ceramic or glass products. One such example is in the preparation of ceramic superconductors, where it is essential for oxygen to reach the centre of the component, and reaction bonded silicon nitride, where the ingress of nitrogen is needed. If the centre is hotter that the surface during the reaction. stages, it will enhance the ingress of gas to the centre. This type of controlled manipulation of the temperature profile within a component at all stages of the firing cycle is really only possible using a hybrid microwave furnace. As a result the use of certain embodiments of the present invention will enable the manufacture of mechanically enhanced ceramic materials capable of performing in new engineering applications.

Thus to summarise, in microwave-assisted firing the volumetric heating provided by the microwave energy heats the components, while the more conventional radiative heating provided, for example, by a gas flame or electric resistance heating element minimises the heat lost from the surface of the components by providing heat to the surface and its surroundings. This prevents the generation of the destructive temperature profiles associated with both conventional and microwave-only firing.

As thermal stresses are minimised, components can be heated much more rapidly. As a result major energy and process savings can be obtained in terms of a reduction in the time associated with the firing cycle and in increased flexibility since the microwave energy can be directed to where it is required most or even switched off. Where environmentally harmful emissions are involved, the shorter firing time significantly lowers the level of emmissions while finally, and possibly most importantly for the future adoption of microwave firing within the ceramic industry, it has been demonstrated that it is possible to design and install microwave power supplies on existing kilns.

A number of embodiments of the present invention will now be described by way of example with reference to the accompanying drawings in which:

FIG. 1 is schematic representation of the micro structure of a typical ceramic material;

FIGS. 2(a) through 2(f) are schematic illustrations of a number of different polaristation mechanisms found in ceramic and glass materials;

FIG. 5 is a schematic cross-sectional view of a hybrid microwave furnace in accordance with a second embodiment of the present invention.

Figure 1:
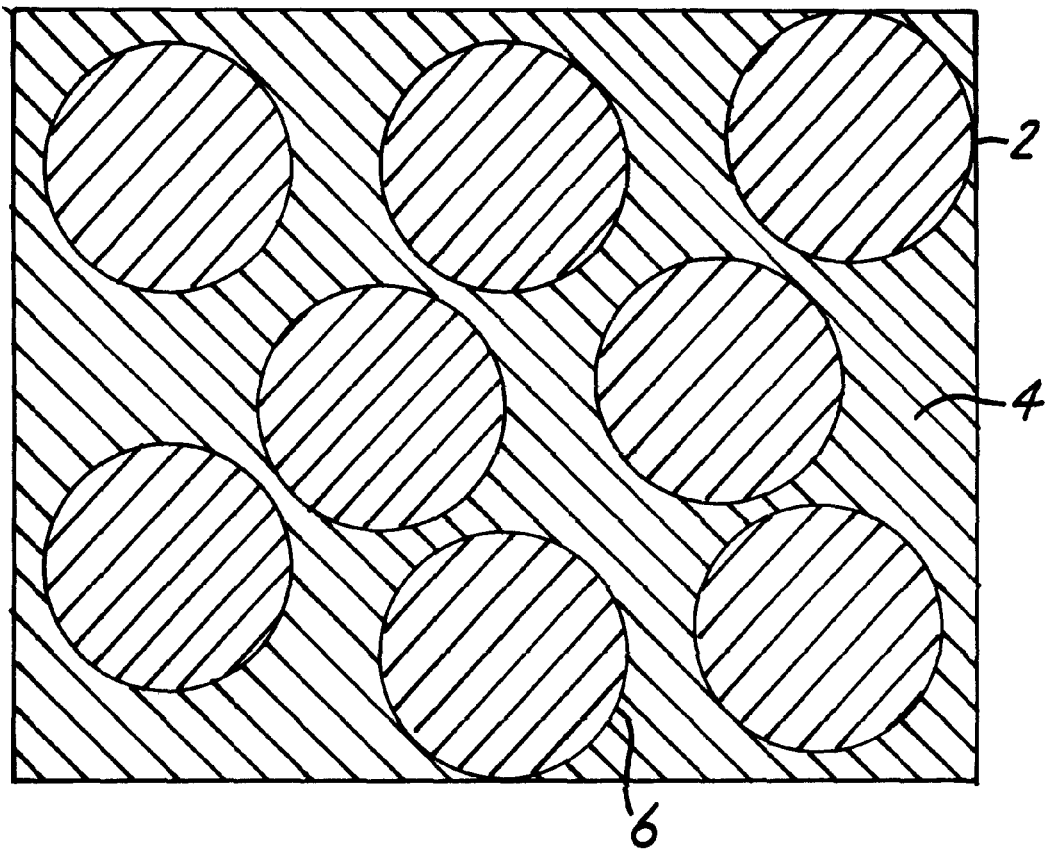
Figure 2:
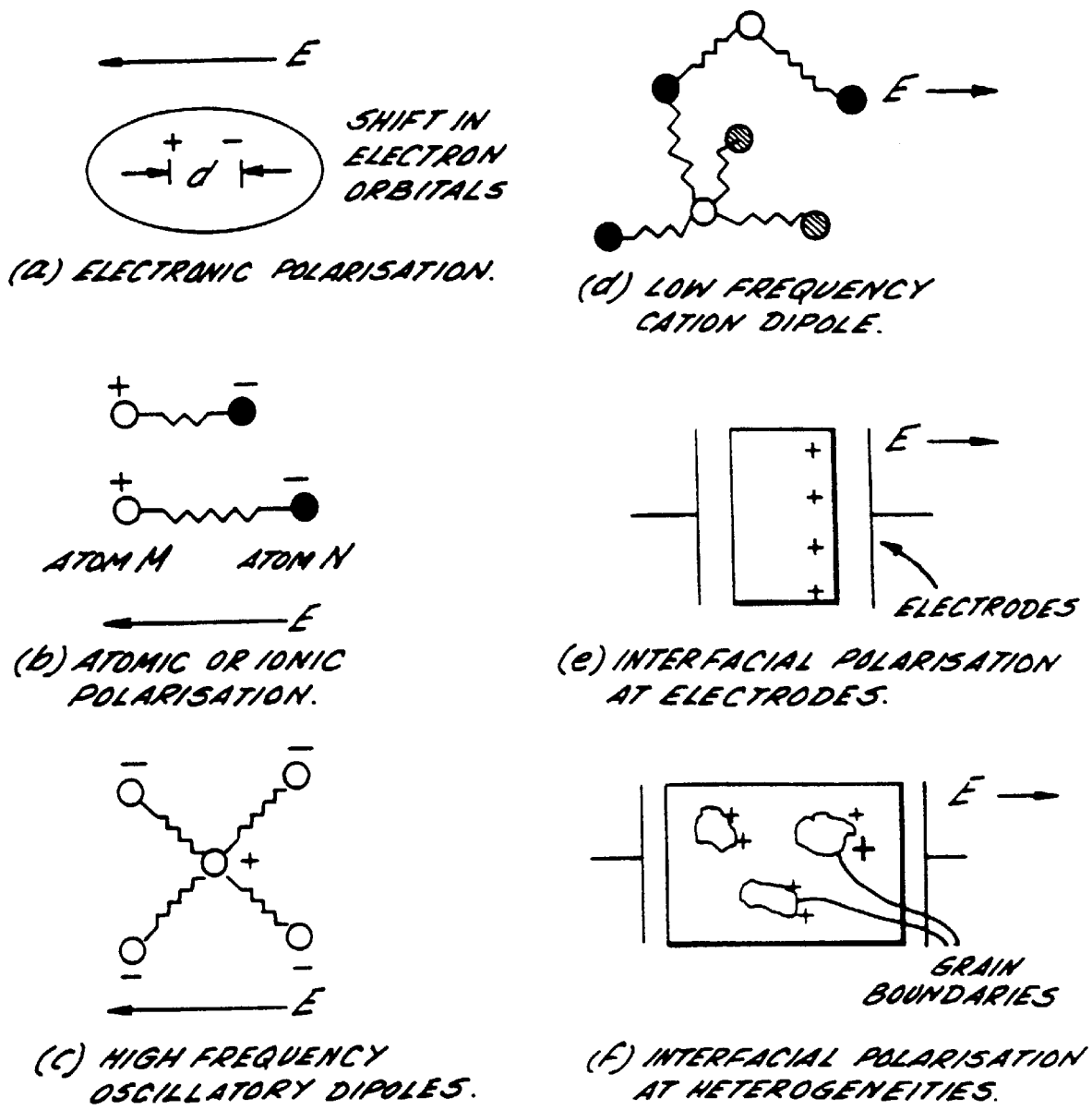

Before describing the embodiments of the present invention however, there will first follow an explanation of the way in which microwaves interact with materials in general, and with ceramics in particular and this in turn will be followed by an explanation of the theory underlying the means whereby the heat generated by the microwaves and the independent radiant heating means might be controlled.

The Interaction of Microwaves With Materials

As is well known, all materials are capable of affecting an electric field in which they are placed and as a result the local field within the material concerned can be very different from that applied externally. In addition it is also well known that certain dielectric insulators interact with high frequency electric fields in such a way that heat is generated within the material. In general the amount of heat that is actually generated depends on the dielectric properties of the material; its electrical conductivity and the frequency and magnitude of the local electric field. It is this generation of heat within a dielectric insulator that is the principle behind all radio frequency and microwave dielectric heating and drying applications.

Several mechanisms have been advanced for the interaction of microwaves with ceramic materials at temperatures in excess of 150° C. These mechanisms have included ion-jump relaxation, which is the alignment of an aliovalent ion impurity-vacancy pair with the electric field, and interracial polarisation due to a localised disruption in electro-neutrality at a defect which results in a net dipole moment and which consequently is capable of aligning itself with an applied electric field. Another mechanism that has been put forward is that the microwave radiation may excite a non-thermal phonon distribution in the material concerned. However before considering these issues in more detail it will be of benefit to first describe a typical ceramic microstructure.

Most ceramic materials are inherently heterogeneous, and can be thought of as dense polycrystalline particles with a boundary layer of glass interposed between the particles. This is the situation shown schematically in FIG. 1 in which the polycrystalline inorganic particles or grains 2 are depicted as surrounded by a glassy or recrystallised glass phase 4 at the grain boundary 6.

The particles 2 are usually of a different composition to that of the glassy or recrystallised glass phase 4, while it is extremely rare to find a polycrystalline ceramic that does not have an interganular layer. The grain boundary phase is usually the result of either additives used to enhance or promote liquid phase sintering, or impurities present in the polycrystalline material which move to the grain boundaries during sintering and form glassy phases. This arises because most of the common impurities in ceramic raw materials are glass formers, such as sodium, potassium, magnesium and iron oxides.

In order to control the behavior of a material in a microwave environment, it is necessary to understand the way in which the material interacts with the microwaves. As might be expected there are many such interaction mechanisms and a list of those relevant to ceramic materials is given below.

- Ionic Conduction
- Dipole Rotation
- Interface Polarisation
- Dipole Stretching
- Ferroelectric Hysteresis
- Electric Domain Wall Resonance
- Electrostriction
- Nuclear Magnetic Resonance
- Ferromagnetic Resonance
- Ferrimagnatic Resonance Of the above mentioned mechanisms, ionic conductivity involves the long-range migration of ionic charge carriers through the material under the impetus of an applied electric field. By contrast the other dielectric Properties comprise the non long-range electrical conducting characteristics of the material. However it is the ionic conductivity of the material that will be considered first.

When considering ionic conductivity the relevant charge carriers will be the most mobile ions in the material. For silicate glasses this will normally be the +1 valence cations which move in an immobile $SiO_2$ matrix. By contrast alkali-ion migration within the grain boundaries is often the dominant ionic conduction mechanism in polycrystalline ceramics. In fast-ion conductors such as the beta aluminas it is again the alkali ions that move through the ordered ionic defect lattice while in stabilised zirconias it is the anion which moves. In each case the interaction of the electric field with the ion tends to perturb its random thermal motion by increasing the probability of a transition in the direction of the applied field.

By contrast the dielectric responses result from the short range motion of charge carriers under the influence of an applied electric field. The motion of the charges leads to the storage of electrical energy and what is referred to as the capacitance of the dielectric, where capacitance is defined in terms of the ability of two conductors in proximity to store a charge Q when a potential difference V is applied between them.
Thus:

$$C = \frac{Q}{V} \quad (1)$$

In a vacuum the capacitance of a capacitor is determined purely by its geometry. It can be shown, for example, that for a parallel plate capacitor the charge density on the plates Q is proportional to their area A and the intensity E of the applied electric field, where:

$$E = V/d$$

and d is the distance between the plates. The constant of proportionality is defined as the permittivity of free space $\epsilon_0$ and is equal to $8.854 \times 10^{-12}$ F/m. Thus the capacitance of a parallel plate capacitor in a vacuum is given by:

$$Q = qA = \pm \epsilon EA = \epsilon.(V/d)A \quad (2)$$

$$C_o = \frac{Q}{V} = \frac{\epsilon_o(V/d)A}{V} = \epsilon_o A/d \quad (3)$$

where:
q is the charge per unit area, and
A is the area of the plates in square meters When a material is inserted between the plates the capacitance C is increased. Thus it is possible to define a dielectric constant k which is the ratio of the capacitance of a capacitor with a dielectric between its plates to that with a vacuum between the plates, where:

$$k = \frac{C}{C_o} = \frac{\epsilon A/d}{\epsilon_o A/d} = \frac{\epsilon}{\epsilon_o} \quad (4)$$

and $\epsilon$ is the permittivity of the dielectric material in Farads per meter.

Thus it can be seen that the dielectric constant of a material k is the ratio of the permittivity of the material to that of free space, and as a consequence it is therefore also known as the relative permittivity.

Equation (4) shows that the presence of a material between the plates of a parallel plate capacitor increases the ability of the capacitor to store charge. The reason for this is that the material contains charged species which can be displaced in response to the application of an electric field across the material. The displaced charges within the material compose dipoles with a moment $\mu = Q\delta$ where $\delta$ is the separation distance, and orientate themselves with respect to the electric field. The effect of this orientation is to 'tie-up' charges on the plates of the capacitor and thus neutralise part of the applied field. The remaining charge which is not neutralised by dipoles and which is sometimes called the free charge, is equal to Q/k and gives rise to an electric field and associated voltage which can be expressed as: $V = (Q/k) C_o$. As a result a smaller external field is required to maintain the same surface charge because part of the field is held by the polarisation within the dielectric.

Within ceramics and glasses there are four primary mechanisms that result in polarisation. Each mechanism involves a short-range motion of the charges and contributes to the total polarisation of the material.

These polarisation mechanisms include:
- Electronic Polarisation ($P_e$)
- Atomic Polarisation ($P_a$)
- Dipole Polarisation ($P_d$)
- Interfacial Polarisation ($P_i$)

and each is illustrated schematically in FIGS. 2(a)–(f).

In the past attention has concentrated on dipole polarisation, as this was thought to be the principal contributor to dielectric polarisation in the sub infra-red range of frequencies. Dipole polarisation, which is also known as orientational polarisation, involves the perturbation of the thermal motion of molecular or ionic dipoles and results in a net dipolar orientation in the direction of the applied field.

Of these two types of dipole most attention has been focused on molecular dipole polarisation in which molecules containing a permanent dipole are rotated against an elastic restoring force about an equilibrium position. Most theoretical studies have also focused on molecular rotation as this is of particular importance in the heat treatment and drying of foodstuffs where it is the water molecule which is rotating.

There is however a second mechanism of dipole polarisation which is an especially important contributor to the room temperature dielectric behavior of glasses and ceramics. It involves the rotation of dipoles between two equivalent equilibrium positions and it is the spontaneous alignment of these dipoles in one of the equilibrium positions which gives rise to the non-linear polarisation behavior of ferroelectric materials. For linear dielectrics, orientational polarisation occurs primarily as a result of the motion of charged ions between interstitial positions within the ionic structure of the material. In this context the effect of the applied field is to make more probable a jump in a direction parallel to the field. Since an appreciable distance is involved in such an ionic transition, the polarisation occurs within a frequency range of between $10^3$ and $10^6$ Hz at room temperature. However, as the temperature rises, the ionic species have more energy available to them, and the frequency with which the polarisation occurs increases. Because this mechanism involves the same mobile cations that contribute to the DC conductivity, they are sometimes referred to as migration losses.

In addition to dipole polarisation, the fourth of the above mentioned polarisation mechanisms, that of interfacial or space charge polarisation, is also of importance in the dielectric behavior of ceramics and glasses. This mechanism occurs when mobile charge carriers are impeded by a physical barrier that inhibits charge migration. The charges pile up at the barrier producing a localised polarisation of the material. If the barrier is an internal structural feature, such as in polycrystalline ceramics, or if the density of the charges contributing to the interfacial polarisation is sufficiently high, the frequency range of this polarisation can extend into the $10^3$ Hz range.

An excellent example of this behavior is to be found in polycrystalline β-alumina. Polycrystalline β-alumina is a fast-ion conductor which is used in sodium sulphur batteries. In this material the fast ion conduction paths are impeded at the grain boundaries by the lattice mismatch. As a result the grain boundaries decrease the conductance of these fast ion conductors and give rise to AC frequency effects. Indeed the specific conductivity of polycrystalline β-alumina with temperature is over 10 times lower than that for the single crystal. An important consequence of this is that as a result the higher resistance of the grain boundaries a large fraction of the applied voltage in a sodium sulphur battery appears across the grain boundaries. It has been calculated that the local electric field can be as large as $10^5$ V/cm when 1 V is applied. across a typical polycrystalline β-alumina ceramic having a thickness of 1 mm with $10^3$ grain boundaries/cm, and a grain boundary thickness of $10^{-7}$ cm.

Likewise, in normal polycrystalline ceramics, most of the ionic conduction occurs at the glass-containing grain boundaries. For these materials the conduction paths will be impeded by the lower conductance of the non-conducting ceramic. The same thing can happen if there is not a continuous glass phase which can occur when the glass is gradually being reacted, for example, during liquid phase sintering, during the final stages of solid state sintering when most of the glass ends up in the triple points at grain junctions or the temperature is not sufficiently high enough for glass formation to be complete.

In addition, the dielectric properties of some ceramics arise as a result of their semi-conductor nature. One example of this is silicon carbide. Silicon carbide is a high-band gap semiconductor whose resistivity decreases rapidly with temperature. As a result silicon carbide changes from being a reasonable absorber of microwave energy at room temperature to a reflector of microwave energy at high temperatures.

Towards a Model For the Heating of Ceramics and Glass

If a sinusoidal potential $$V = V_0 exp i\omega t \qquad (5)$$

is applied to a dielectric, it will be apparent that the charge must vary with time thereby giving rise to a charging current, $I_c$ where:

$$Q = CV; \qquad (6)$$

so $$I_c = dQ/dt = i\omega CV.exp[i(\omega t + \pi/2)] \qquad (7)$$

Thus it can be seen that the charging current in an ideal dielectric leads the applied voltage by π/2 radians (ie. 90°.)

However, in addition to the charging current associated with the storage of electric charge by the dipoles, a loss current must also be considered for real dielectrics. This loss current arises from two sources. The long range migration of charges, for example in DC Ohmic conduction, and the dissipation of energy associated with the rotary oscillation of the dipoles. This latter contribution to the dielectric losses is a consequence of the charged particles being moved. Electrical from the applied field is lost in the overcoming of this inertia during polarisation. Both the AC conduction from the inertial resistance and the DC conduction are in phase with the applied voltage. Consequently a loss current in the dielectric can be written as $$I_l = (G_{dc} + G_{ac})V \qquad (8)$$

where G is the conductance in Siemens. (Ohms$^{-1}$)

The total current It for a real dielectric is thus the sum of equations (7) and (8)

$$I_t = I_c + I_L = (i\omega C + G_{dc} + G_{ac})V \qquad (9)$$

The total current in a real dielectric is therefore a complex quantity which leads the voltage by an angle (90°-δ) where δ is called the loss angle.

An alternative way of expressing the concept of a real dielectric exhibiting both charging and loss mechanisms is to use a complex permittivity to describe the material:

$$\epsilon^* = \epsilon' - j\epsilon'' \qquad (10)$$

$$\text{and } k^* = \epsilon^*/\epsilon_0 = k' - ik'' \qquad (11)$$

As a result the total current in the dielectric can be described in terms of the single material parameter k*, since:

$$C = k^* C_0 soQ = CV = k^* C_0 V \qquad (12)$$

and $$i = dQ/dt = CdV/dt = k^* C_0 i\omega V = (k' - ik'')C_0 i\omega V_0 exp i\omega t \qquad (13)$$

and thus $$I_t = i\omega k' C_0 V + \omega k'' C_0 V \qquad (14)$$

The first term describes the charge storage within the dielectric and thus k' is called the charging constant or often just the dielectric constant, and e" and k" are referred to as the dielectric loss factor and the relative loss factor respectively. The loss tangent, loss angle, or dissipation factor, tan δ, is defined as:

$$\tan\delta = \frac{\epsilon''}{\epsilon'} = \frac{k''}{k'} \qquad (15)$$

This dissipation factor represents the relative expenditure of energy to obtain a given amount of charge storage. The product, k" or K' tan δ, is sometimes termed the total loss factor and provides the primary criterion for evaluating the usefulness of a dielectric as, an insulator. In dielectric heating, however, the critical materials parameters are the dielectric charging constant k' and the dielectric conductivity $\sigma_T$ which is given by:

$$\sigma_T = \omega k'' \qquad (16)$$

The effective permittivity of a material can therefore be written as:

$$\epsilon_{eff} = \epsilon'' + \delta/\omega\epsilon_0 \qquad (17)$$

In the past the formulation of models to control the microwave heating and firing of ceramic materials has been an empirically-based study because of the lack of high temperature dielectric property data. Of the models that have been developed most have concentrated on the thermal profiles formed within ceramic components as a result of microwave heating and on the known heat capacity and thermal conductivity of the ceramic, coupled with the heat loss from the surface of the component due to radiation and convection. Where the dielectric behavior has been considered it has been assumed that it either remains constant, or increases exponentially with temperature. For example one model has assumed that for many ceramic materials the loss factor for microwave heating, tan δ, is very small at ambient temperatures, but increases within a certain temperature range very rapidly. Mathematically this was expressed as a rate of heating which consisted of a constant term, plus a term that increased exponentially with temperature:

$$g(T) = g_0(1.0 + e^{\gamma(T-T_B)}) \tag{18}$$

where $T_B$ denotes the temperature at which the rate of heating begins to increase exponentially.

However, if the behavior of materials in a microwave field could be predicted with a higher degree of accuracy, and preferably using established data, the ability to control the heating and drying of materials using radio and microwave frequencies would be significantly improved. It would also mean that the specification of equipment would be much simpler, as the total amount of microwave power required would be known.

The fundamental principle in controlling the microwave-assisted process is in the control of the heat flow within the kiln to achieve one of the following three situations.

1. Zero heat flow, i.e. the component and the surroundings are all at the same temperature.
2. Heat flow from the surroundings to the component(s), i.e. the formation of a normal temperature profile.
3. Heat flow from the component(s) to the surroundings, i.e. the formation of an inverted temperature profile.

The general equation for transient heat flow may be written as follows:

$$\Delta(k\Delta T) + g = \rho c \frac{\delta T}{\delta t} \tag{19}$$

where

T is the temperature,
t is the time,
ρ is the density,
c is the specific heat, and
g is the rate of heat production per unit volume.

Several specific solutions to this equation have already been formulated for a range of geometries. However the following model is described in one dimension only for the sake of clarity of presentation although it will be apparent that the appropriate mathematical solutions for 2 and 3 dimensions also exist.

For a one dimensional model, where it is assumed that all functions vary in only one spatial direction, r, equation (19) can be re-written as:

$$\frac{1}{S} \frac{\delta}{\delta r}\left(kS \frac{\delta T}{\delta r}\right) + g = \rho c \frac{\delta T}{\delta t} \tag{20}$$

where S is the area of a cross-section perpendicular to r.

Allowing S to be proportional to $r^n$, the equation becomes:

$$\frac{1}{r^n} \frac{\delta}{\delta r}\left(kr^n \frac{\delta T}{\delta r}\right) + g = \rho c \frac{\delta T}{\delta t} \tag{21}$$

Where it is to be noted that setting n=0 corresponds to a linear geometry, while setting n=1 corresponds to a cylindrical geometry, and setting n=2 corresponds to a spherical geometry.

The equation is not however confined to integral values of n since varying n allows the incorporation of a ratio of surface area to volume which is characteristic of the geometry of the component being modelled. This in turn permits the establishment of a temperature profile within the component where it is assumed that r varies from zero to an outer radius R which is characteristic of the distance of the surface from the centre.

To complete this part of the comprehensive control model, it is necessary to define the temperature of the surroundings, which will also be the initial temperature, $T_0$, and to define the boundary condition on the outer surface of the component. This is taken to be the heat transfer condition:

$$k \frac{\delta T}{\delta r}\bigg|_{r=R} = -[h(T_{r=R} - T_{amb}) + C(T_{r=R} - T_{amb})^{5/4} + \epsilon_\lambda \sigma_o (T_{r=R}^4 - T_{amb}^4)] \tag{22}$$

where h is the conduction heat transfer coefficient at the outer surface,
C is the convective heat transfer coefficient at the outer surface,
$\epsilon_\lambda$ is the emissivity, and
$\sigma_0$ is the Stefan-Boltzman constant.

In general, the material's properties and the heat generation term may be complicated functions of both position, temperature, time and history. However, much can be gained from assuming that all the parameters have constant values and only the final steady state temperature is sought. The steady state case corresponds to the situation of maximum thermal gradients, for any one heat flow situation.

In conventional heating, heat is transferred from the surrounding heat source to the component by means of convection, radiation and conduction. The heat is then transferred within the component by thermal conduction As a result the surface of the ceramic is hotter than the centre, the differential being dependant on the thermal conduction properties of the ceramic.

In microwave-only heating, the component is heated 'volumetrically' and there is heat transfer from the surface of the ceramic to the surrounding environment as the temperature of the environment is lower than that of the surface of the ceramic is cooler than the centre.

If, as in microwave-assisted heating, the microwaves volumetrically heat the component, while a conventional gas or electric heat source heats the surface, then, if the two heat sources are balanced, there will be effectively zero heat transfer to or from the surface of the component. Under these conditions the thermal stresses within a particular component can be minimised.

In addition however, it will be apparent that microwave-assisted heating can also be used to arrive at two further flow situations, namely heat flow from the surroundings to the component (i.e. the formation of a normal temperature profile as in conventional heating), and heat flow from the component to the surroundings (i.e. the formation of an inverted temperature profile as in microwave-only heating).

The power required to heat the furnace environment and the component from $T_o$ to T in t seconds is in:

| Situation 1 | |
|---|---|
| Microwave power required for + heating components volumetrically | Conventional power to balance radiative, convection and heat losses from the kiln. |
| Situation 2 | |
| Microwave power required for + heating components volumetrically | Conventional power to balance radiative, convection and heat losses from the kiln where the conventional power is greater than the microwave power. |
| Situation 3 | |
| Microwave power required for + heating components | Conventional power to balance radiative, convection and heat losses from the kiln where the conventional power is less than the microwave power. |

The conventional power can be calculated by either estimating, modelling or measuring the heat losses for a given kiln, from, primarily, the heat transfer through the insulation. It is therefore possible to calculate the amount of power needed to maintain a specified heating rate within the environment of the component to be heated. Using existing heat flow computational software in up to 3 dimensions, accurate values of the conventional power required can be calculated However, calculating the amount of microwave power needed, at a given temperature, to produce a specific heating rate in complex materials of varying density and weights, requires a detailed knowledge of how microwaves interact with the materials concerned. A simple approximation can be made by calculating the theoretical minimum heat rate required:

$$\frac{H}{t} = mc(T - T_{amb}) \quad (23)$$

where

H is the heat required for the change in temperature
m is the mass of ceramic being heated and
c is the material s heat capacity However this does not take into consideration issues such as the amount of microwave power absorbed by the material, how much is reflected from the surface of the component, and how these factors change with temperature. As has been previously mentioned, dielectric property data for ceramic materials at high temperatures is scarce and dependant on the measurement method used.

The following two sections, will therefore describe how to calculate the amount of power required for a known ceramic composition to produce a controlled heating and cooling cycle using currently available dielectric and, just as importantly, ionic conductivity property data.

The control models outlined below are necessary in order to calculate the amount of microwave power required at any one point in a thermal cycle. They take into account two different ceramic structure scenarios to allow for the observed variation in dielectric and ionic conductivity behavior during the sintering of a ceramic component and in any subsequent reheating situation. The two scenarios, are as follows.

Scenario 1: The ceramic is treated as a monolithic component for the purpose of heat flow and dielectric behavior.

This scenario is applicable to the following ceramics:
- Semi conductors such as Silicon Carbide;
- Fast ion conductors such as β or β" alumina;
- Ferroelectric and ferrielectric ceramics; and
- Magnets Scenario 2: The ceramic is treated as having a structure as shown in FIG. 1 composed of spherical polycrystalline grains, surrounded by an intergranular phase, which becomes a glass, at the glass eutectic (formation) temperature. This scenario is applicable to most ceramics, including traditional ceramic markets such as pottery, sanitary ware, refractories, heavy clay and bricks.

It is to be noted that in order to correctly assess within which of the two scenarios certain materials fall it is advisable to measure the activation energies and other important parameters relating to the sintering of the material concerned using a sintering dilatometer. Previous studies have found, for example, that for some fast ion conductors such as fully stabilised zirconia, the activation energy measured in the microwave environment would suggest that the mechanism for sintering was grain boundary diffusion, and not cation diffusion sintering. One possible explanation of this could be that the cationic diffusion leads to a charge build up at the grain boundaries, with interfacial polarisation as the dominant dielectric interaction. It might therefore be more appropriate to use Scenario 2 in controlling the sintering of zirconia materials as the inter rather than the intra granular model would appear to be more realistic.

This again serves to emphasise the need to know the electronic nature of the material and the way in which it interacts with the microwave environment. Another example is that where there are organic binders or water present, it has been found preferable to treat the $E_{\it{eff}}$ as outlined in Scenario 2 as the binder or water will significantly affect the dielectric properties.

A Microwave Power Control Model For Scenario 1

In this scenario the ceramic is treated as a monolithic component for the purpose of dielectric behavior. The amount of microwave power, P, absorbed per unit volume in the ceramic may be used to determine the rate of rise of the temperature, T, assuming that the heat losses and gains through the surface are ignored. Thus:

$$\rho c_p \frac{\sigma T}{\sigma t} = P = \epsilon_0 \epsilon''_{\it{eff}} \omega E^2_{rms} \quad (24)$$

where

ρ is the density of the material (kg/cu.m)
$C_p$ is the specific heat capacity (J/kg.deg.C.)
$\epsilon_0 = 10^{-12}$ (F/m)
ω=2 nf If in addition the material exhibits loss, the permeability will attain a complex form, and the above equation should be modified to include the magnetic wall domain and electron spin losses by adding to the right hand side the term $\mu_o \mu'' \omega H^2_{rms}$ At a given frequency, f, $\epsilon''_{\it{eff}}$ is usually dependant on temperature. Therefore, if a constant rate of rise in temperature is required, then $E^2_{rms}$ must be controlled according to the above equation, or if $E^2_{rms}$ is kept constant, integration of the equation will give the rise in temperature over a time interval t.

Thus:

$$E_{rms}^2 = \frac{1}{t}\int_{T_0}^{T}\frac{\rho c_p d\,T}{\omega \epsilon_0 \epsilon''_{eff}(T)} \quad (25)$$

Knowing the power, it is possible to calculate the power required to raise the temperature from $T_o^\circ C$ to $T^\circ C$ in t seconds. This is given by extending the equation such that:

$$P = \frac{Q_h}{t} = M_a C_p (T-T_0)/t \quad (26)$$

where $M_a$ is the mass of material (kg)
and $C_P$ is the specific heat capacity (J/kg° C.)
Substituting equation (26) into equation (25) gives:

$$(T-T_0)/t = \frac{0.556 \times 10^{-10} \varepsilon''_{eff} fE_{rms}^2}{\rho c_p} \circ C.\,s^{-1} \quad (27)$$

where ρ is the density of the material (kg/m³)
This determines the amount of power needed to be absorbed by the material to effect the temperature rise.

For given material heated by high frequency energy at a given f, the rate of temperature rise is dependant on $\epsilon''_{eff}$ and $E^2_{rms}$ which itself is normally dependant on temperature due to the variation of $\epsilon''_{eff}$ with T. It is possible to calculate the $E^2_{rms}$ if the frequency and $\epsilon''_{eff}$ is known, using the equation (27).

The total amount of microwave energy required to heat the system depends not only upon the local rate of heating but also upon the efficiency with which the power is coupled to the components within the applicator. The incident microwave splits into reflected and refractive constituents at the surface of the component. The power reflected is proportional to $|r|^2$ where the reflection coefficient, r, is defined by:

$$r = \frac{k^*-1}{k^*+1} \quad (28)$$

when the loss angle is small, this becomes:

$$r = \frac{k'-1}{k'+1} \quad (29)$$

If k'<5, then $|r|^2$<15% while k'=12 corresponds to an $|r|1^2$ of about 30%. For a well designed applicator which is tuned to the load, a large number of reflections are possible before a significant amount of energy is absorbed at the walls or reflected into the waveguide However, this aspect needs consideration when material is highly refractive or highly conductive, corresponding to larger values of $|k^*|$.

The magnitude of the refracted wave decays as it passes through the lossy material, the power density decaying as:

$$P = P_{refr} e^{-l\alpha}$$

where:

$$\alpha = \omega\{\varepsilon_0 \mu_0 [k'/2(\sqrt{1-k''^2/k'^2}-1)]\}^{1/2} \quad (31)$$

When the loss angle is small this becomes:

$$\alpha = \frac{\omega k''}{2k}\sqrt{\varepsilon_0 \mu_0 k'} \quad (32)$$

The penetration depth, at which the power density is reduced to 1/e if the incoming refractive power, is given by:

$$d = 1/2\alpha = \sqrt{k'}/(\omega k^* \sqrt{\varepsilon_0 \mu_0}) \quad (33)$$

For a frequency of 2.45 MHz this becomes 0.02/($\sqrt{k'}/k''$) meters.

The proportion of the refracted wave which is absorbed in a component of thickness L is $(1=e^{-L/d})$.

If d<<L, then nearly all the refracted energy is absorbed, However, the power density will also decay strongly from the surface to the interior. Correspondingly it will be more difficult to attain a uniform heating profile. If d>>L, then a large proportion of the energy is transmitted through the material. This leads to inefficient coupling of the load to the supply and it may be advisable to provide some other form of initial heating to reach the temperature where the electrical conductivity increases and d decreases. In the intermediate region, most of the transmitted power will be reflected at the walls of the applicator, and heating will extend to the interior of the component. The actual heating profile may be readily calculated if the material properties are known. The power input required will then be the volume times the power density required to attain the required rate of heating, multiplied by a small factor based on the efficiency of the absorption process and a factor for the generation efficiency of microwave energy, giving typical overall efficiencies of 50% to 60%.

To summarise, for scenario 1, the following parameters must be known in order to know the total power requirements for heating the materials: $\epsilon''_{eff}$ and its variation with temperature and density, the amount of power absorbed, transmitted and reflected, which requires a knowledge of $\epsilon'$ since both reflection and transmission is governed by this, and $E^2_{rms}$, f, ρ and $C_p$.

A Microwave Power Control Model For Scenario 2

In this scenario the ceramic is treated as a component, composed of spherical polycrystalline grains, surrounded by an intergranular phase, which becomes a glass, at the glass formation temperature.

As discussed previously, the particles and glass phase have different ionic conductivities and dielectric behavior as a result of their different chemical and physical natures. All things being equal they will therefore absorb different amounts of microwave power. It is therefore proposed that the microwave energy be treated as being absorbed by both the bulk ceramic and the glass boundary phase, with the relative dielectric properties of the ceramic and glass determining which phase absorbs the most. If the glass phase is the most 'lossy' at any one temperature then the glass will be the prime absorber of the microwave energy, and the heat flowing from the grain boundaries to the bulk specimen, will heat the remainder of the component. Indeed there is mounting evidence that this is the case, from dilatometer experiments which show that the rate of sintering in a microwave environment only increases when microwave energy is present after the formation of glassy phases, to joining experiments which show increased atomic diffusion and softening of the intergranular phases, and the work done on dielectric mix equations.

It is therefore proposed that the microwave power be treated as absorbed by both the glass and the polycrystalline grains, with the glass preferentially absorbing the most. As a result it is necessary to take into account the long range electrical properties of the system as glass is a significant electrical conductor at both high temperatures and high frequencies. Indeed in some glasses it could be that the α term will dominate in the $\epsilon''_{\it eff}$ equation. However, the electrical conduction of glass at high temperatures is well documented and there is a significant amount of data on the effect of temperature and frequency on dielectric properties.

This makes the calculation of $\epsilon''_{\it eff}$ with changing temperature and density much more difficult. It has been found that in general the dielectric mix equations do not give a good fit with experimental data, but that the best fit was obtained by using the Landau and Lifshitz, Looyenga equation for lower loss materials typical of this scenario. Even so the Landau and Lifshitz, Looyenga equation gave an over estimate of 10%. This result is understandable when it is realised that the theoretical $\epsilon''_{\it eff}$ value was derived by measuring samples with greater than 98% density at the appropriate temperatures and extrapolating to the theoretical 100% density. Such samples will have a well defined glass phase at the grain boundaries which will interconnect and so provide good conduction paths. However at lower densities, particularly at temperatures below the glass eutectic, which for some materials can be as high as 1300° C., $\epsilon''_{\it eff}$ will be dominated by, for example, the low loss alumina grains and the resulting permittivity values will consequently be much lower than when the glass values are included.

When the glass is present the microwaves will be preferentially absorbed by them setting up a transient differential heating pattern, with the polycrystalline grains normally absorbing less microwave energy and so being at a lower temperature. Heat will therefore flow from the glass to the grains establishing uniformity of temperature. In a steady state situation, for example when at a holding temperature, equilibrium will be established quickly and the temperature gradients at any one point within the material will be a minimum. However, during the heating or cooling of the material the glass may be at a significantly higher temperature. This would account for the increased sintering rate which is observed for a given temperature when microwaves are present because under these circumstances the heat is being deposited where it is needed, ie. at the grain boundaries. Furthermore, if the microwave energy is being preferentially deposited at the grain boundaries then it will further assist the uniformity of heating above the glass eutectic point.

There are thus two ways in which to calculate the amount of microwave power being deposited within the material and the method chosen will be dependant on the level of computing power available, the desired complexity and, possibly, the material being examined.

Scenario 2: Simple Model For Those Materials With Minimal Levels of Class

Using the Landau and Lifshitz, Looyenga dielectric mix equation, and $\epsilon''_{\it eff}$ values for the single crystal, or highest purity polycrystalline powder (or raw material in the case of, clay particles), the effect is calculated on $\epsilon''_{\it eff}$ of increasing amounts of glass representative of that found in the fired component. The amount of glass formed at a particular temperature can be estimated from dilatometer experiments, or measured by scanning electron or optical microscopy techniques and represents the medium in which the particles are found. By contrast the $\epsilon''_{\it eff}$ values for glass can be found or calculated from existing literature. Using the values obtained for $\epsilon''_{\it eff(ceramic\ \&\ glass)}$ the same equation may be used to calculate the total $\epsilon''_{\it eff}$ value with increasing density whereafter the model may follow the same steps as set out in relation to Scenario 1.

Scenario 2: Alternative Model

This alternative model assumes that there is a significant amount of glass present and that sufficient computing power is available to handle the added complexity. In this model it is assumed that the glass, once formed, absorbs the microwave power, and transfers the heat generated to the spherical polycrystalline grains. Consequently the glass is best treated as a solid in good contact with the grains since by contrast the work on heat conduction from a fluid to a solid assumes that the fluid is very mobile away from the boundary. Thus the equation representing the power required to raise the temperature from $T_0$°C to T°C in t seconds assumes the form:

$$\frac{T - T_0}{t} = \frac{g}{n+1}\left[\frac{R}{h} + \frac{(R^2 - r^2)}{2k}\right] \quad (34)$$

where $$g = \frac{H}{\rho C_p V} = \text{rate of heat production per unit volume}$$

and $H = 0.556 \times 10^{-10} \epsilon''_{\it eff} f E^2_{rms}$

ρ=density of the component

V=volume of the glass $C_P$=heat capacity of glass k=thermal conductivity of the ceramic $R^2 - r^2$=(average particle size/2)$^2$ n=2 (sphere)

H=rate of heat production.

h=transfer coefficient (depends on the viscosity of the glass)

with $\epsilon_{\it eff}$ now equal to that of the glass.

The total power required will still need to allow for that which will be reflected and transmitted. Thus:

$$P_{total} = g + P_{transmitted(\epsilon''_{\it eff}glass)} + P_{reflected(\epsilon''_{\it eff}[ceramic+glass])} \cdots \quad (35)$$

The absorbed power will depend primarily on the glass present, while the reflected power will be a function of the cumulative ε'. Both can be calculated as shown in relation to scenario 1, and the appropriate correction factors applied to H.

EMBODIMENTS OF THE PRESENT INVENTION

Figure 3:
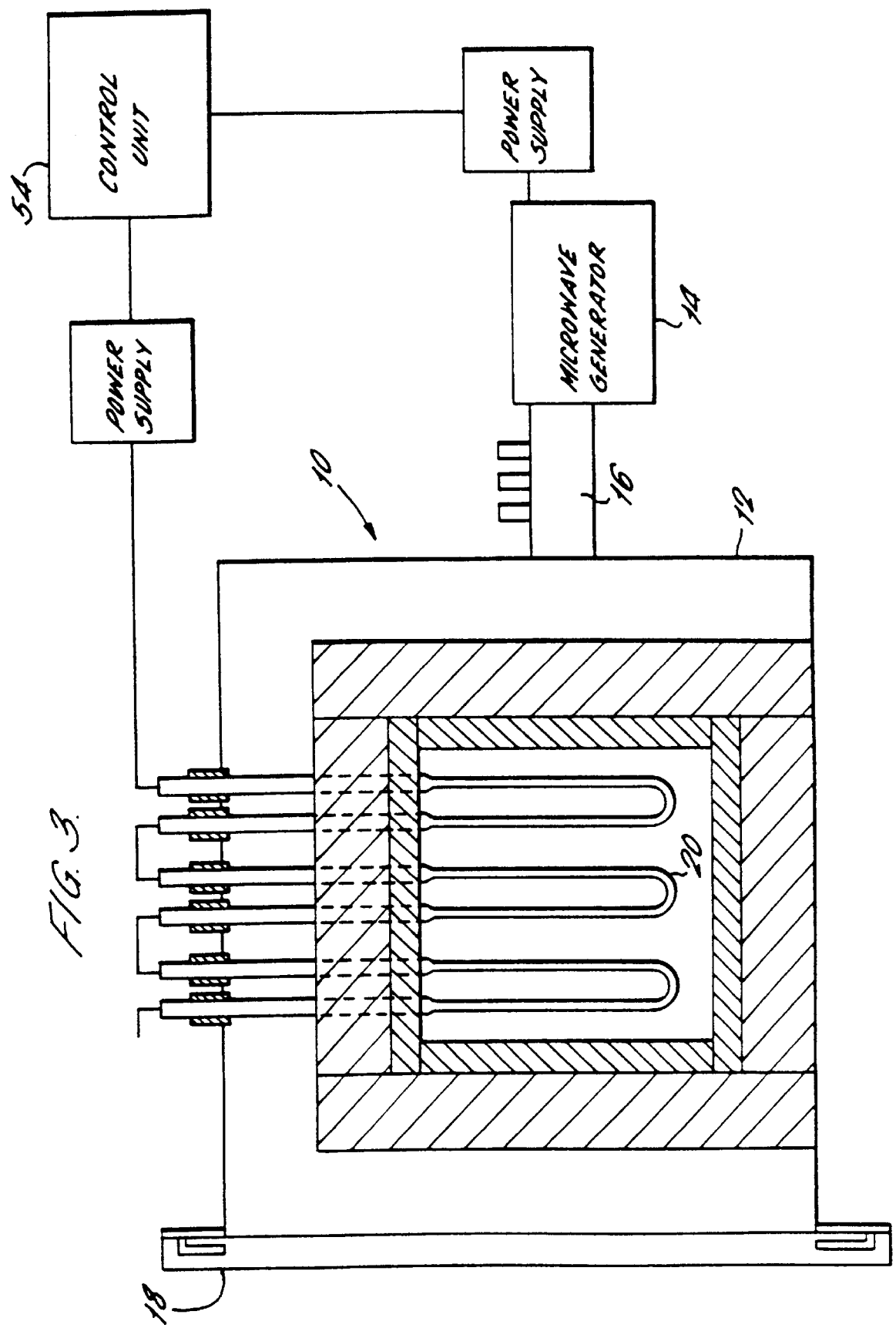
FIG. 3 is a schematic cross-sectional view of a hybrid microwave furnace in accordance with a first embodiment of the present invention.

Referring now to FIG. 3, there is shown a hybrid microwave furnace 10 comprising a microwave cavity 12, a microwave generator 14 and a waveguide 16 for transporting microwaves from the microwave generator 14 to the microwave cavity 12. In a currently preferred embodiment the microwave cavity has a width of 455 mm, a depth of 435 mm and height of 390 mm. This in turn provides a sample volume of 150 mm×150 mm×200 mm which in use is closed by the shutting of a door 18 incorporating a quarterwave choke microwave seal. A mode stirrer (not shown) is incorporated within the microwave cavity 12 with a fail-safe mechanism for switching off the microwave power in the event of the mode stirrer failing.

A plurality of non-retractable, radiant kanthal resistance heating elements 20 project through a wall of the microwave cavity 12 and into the sample volume. By ensuring that the heating elements 20 are highly conductive their skin depth is kept to a minimum and with it the amount of microwave power that they absorb. Using this arrangement the furnace 10 has been shown to be capable of achieving temperatures in excess of 1750° C. using 3 kW of radiant heating and 2 kW of microwave power without damaging either of the heating elements 20 or the lining of the furnace. In particular, no arcing has been observed either between the radiant heating element 20 or between the radiant heating elements and the walls of the microwave cavity 12.

Figure 4:
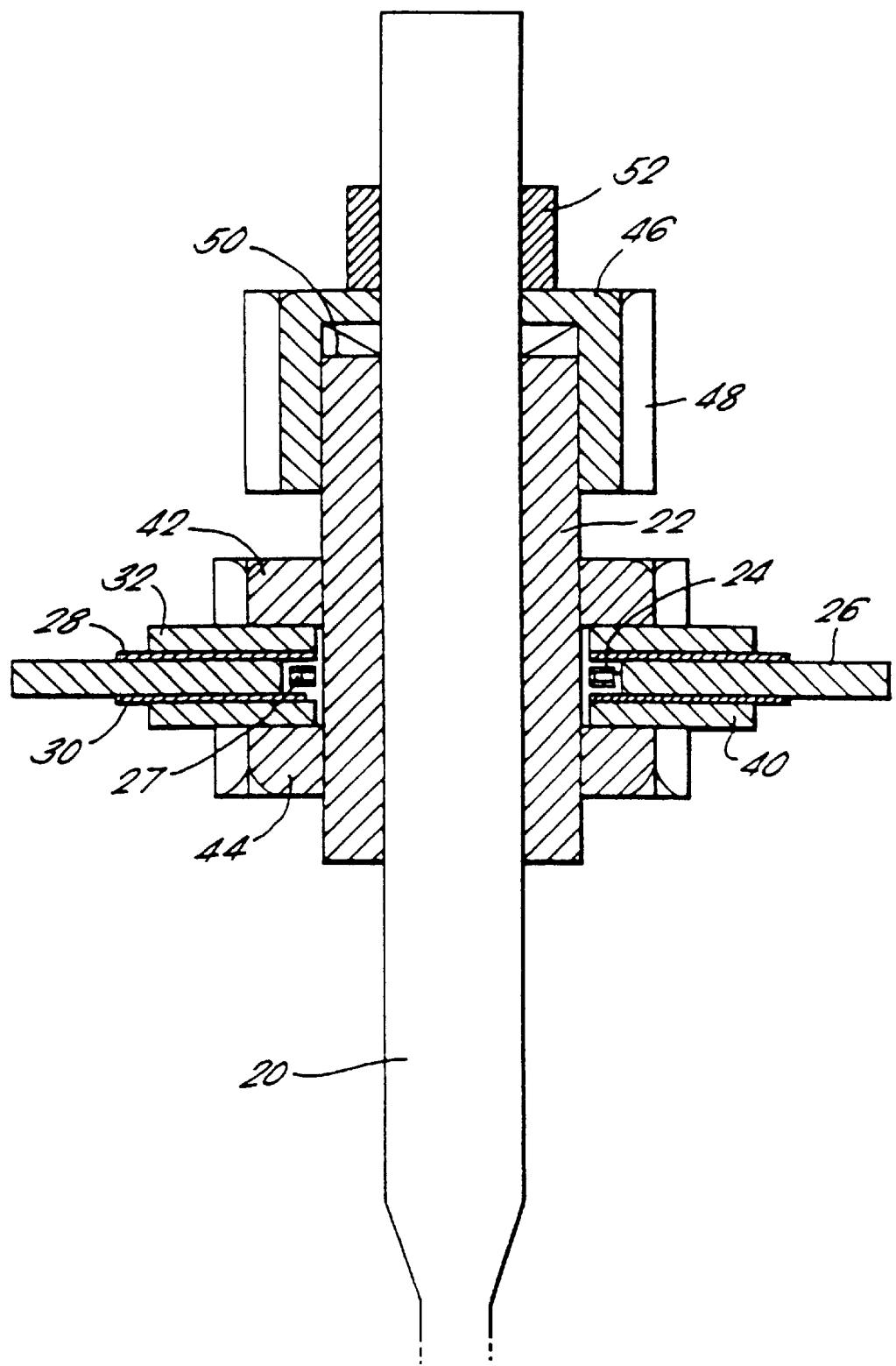
FIG. 4 is an enlarged cross-sectional view of a capacitive lead-through of the furnace of FIG. 3.

In order to prevent microwaves leaking from the microwave cavity 12, each of the radiant heating elements 20 passes into the sample volume through a respective capacitive lead-through, an example of which is shown in more detail in FIG. 4. As can be seen, a cylindrical bushing 22 is received by the radiant heating element 20 and both the bushing and heating element pass through an opening 24 provided in the cavity wall 26. An annular ceramic spacer 27 is interposed between the bushing 22 and the cavity wall 26 where it is held in place by the location on either side of one of a respective pair of mica washers 28 and 30. The mica washers 28 and 30 are in turn held in place by the combination of a respective one of a pair of annular brass plates 32 and 40 and a pair of locknuts 42 and 44. A clamping nut 46 having a depending skirt portion 48 is received by the heating element 20 externally of the microwave cavity 12 in such way that the depending skirt portion 48 slides over and receives one end 50 of the cylindrical bushing 22. Finally, a ferrite ring 52 is pushed over the heating element 20 and into engagement with the clamping nut 46 where, in use, it is kept cool by an air fan (not shown). By ensuring that the ferrite ring 52 has a high permeability at a frequency of 2.45 GHz and up to 110° C. it has been found that the capacitive lead-through is able to substantially eliminate microwave leakage from the microwave cavity 12. The small amount of leakage that has been detected with this design was 10% of the current permitted maximum and out of range of normal operation.

In use the instantaneous ambient temperature within the microwave cavity 12 is measured by an appropriate temperature sensor (not shown) such as a pyrometer, light pipe, black body probe or sheathed thermocouple. The advantage of using a sheathed thermocouple however is that it permits the ambient temperature within the cavity to be read throughout the range from room temperature to 1750° C (the other temperature measuring devices have a more restricted range and are typically only used at temperatures in excess of 500°C.). At the same time the net quantity of microwave power delivered to the microwave cavity 12 is also determined by means of a sensor (again not shown) provided at the entrance to the waveguide 16. Signals from these two sensors are then directed to a suitable control unit 54 such as a Eurotherm 818P programmer which then adjusts the heat generated by one or both of the microwaves or the radiant heating elements 20 in accordance with the aforementioned algorithm in order to ensure a desired thermal profile. In particular, if it is desired to establish a normal temperature profile in which the surfaces of the components to be heated are hotter than their respective centres, the heat generated by the radiant heating elements 20 is adjusted so as to be greater than that generated by the microwaves from the microwave generator 14. Conversely, if it is desired to establish an inverted temperature profile in which the surfaces of the components to be heated are cooler than their respective centres, then the heat generated by the microwaves from the microwave generator 14 is adjusted so as to be greater than that generated by the radiant heating elements 20.

Perhaps the most useful result however, is achieved by adjusting one or both of the microwaves or the radiant heating elements 20 so that the heat generated by the radiant heating elements substantially balances out the heat lost by the components as a result of the various surface heat loss mechanisms to which they are subject. Under these conditions the components and their environment are in thermal equilibrium. As a result there is minimal heat transfer between the two and the thermal stress within the components is reduced to close to zero.

To this end the control unit 54 uses the signal derived from the temperature sensor in conjunction with a number of predetermined constants in order to determine the instantaneous surface temperature of the components to be heated using equations such as that previously referred to as equation (22). This value is then compared with that derived using the signals from both the temperature sensor and the microwave power sensor in conjunction with the equations previously referred to as either equation (27) or (34) depending on the scenario into which the component to be heated falls. As a result of this comparison if it is found that the temperature at the centre of the component is rising faster than that at the surface and this is not what is desired then either the heat generated by the microwaves is reduced or the heat generated by the radiant heating elements is increased until the desired thermal profile is achieved. Conversely, if as a result of this comparison it is found that the temperature at the centre of the components is rising slower than that at the surface and this is again not what is desired, then either the heat generated by the microwaves is increased or the heat generated by the radiant heating elements is reduced.

During preliminary trials the internal temperature of a series of test pieces can be measured by drilling a small hole in the test piece and inserting a sheathed thermocouple. By comparing the internal and external temperatures an assessment of the accuracy of the control algorithm can be made together with the incorporation of a correction factor if required.

In a currently preferred embodiment the heat generated by the microwaves is adjusted manually or kept constant while the relative heat generated by the radiant heating elements is controlled by the control unit 54 in accordance with a suitable algorithm in order to achieve the desired thermal profile. Alternatively, both the microwave power and the radiant power can be controlled simultaneously.

Although the radiant heating elements 20 have been described as non-retractable, it will be apparent to those skilled in the art that this need not necessarily be the case. Indeed, the radiant heating elements might be adapted so as to be moveable from a first position in which they project through a wall of the microwave cavity and into the sample volume to a second position in which they do not.

Furthermore, although the furnace 10 has been described as comprising a single microwave generator 14, it will again be apparent to those skilled in the art that this need not necessarily be the case. Indeed, there are advantages in terms of a reduction in operating costs of employing two or more low powered magnetrons (ie. of between 1 and 2 kW) rather than using a single magnetron of increased power. This is particularly so if the microwaves are only switched on when the components to be heated have been raised to a temperature at which they are suitably absorbent. In this way the field strength within the cavity is kept to a minimum and the possibilities of arcing or of forming hot-spots on the resistance elements are minimised, if not eliminated altogether. To this end the control unit may be programmed so as to switch the microwave power on or off at one or more of a series or predetermined temperatures or time intervals.

The advantages of this approach are numerous. Firstly, since the furnace may only require between 10 and 25% of the microwave energy of a microwave-only furnace in order to be volumetric, the capital cost associated with the necessary hardware is reduced significantly. Secondly, electric radiant heating is considerably more energy efficient than microwave generated radiant heating using, for example, one or more susceptors, and much simpler to control. Furthermore, on long term trials it has been found that the properties of susceptor materials change substantially, making control and reproducible results even more difficult.

Finally, by allowing separate control of the microwave and radiant heating within the same enclosure and throughout the entire temperature range currently used within the ceramic and glass industries, an ideal balance between microwave and conventional power can be achieved for any stage of the process, with resulting benefits not only in the end product and process control but also in process flexibility.

In addition to the foregoing it will be apparent to those skilled in the art that the present invention is equally applicable to continuous processing systems involving the use of one or more tunnel furnaces. One such tunnel furnace is shown in FIG. 5 to comprise a microwave cavity 60 constructed of a refractory metal such as Inconel MA 956 and surrounded on opposite sides with a plurality of electric resistent heating elements 62. Both the heating elements 62 and the microwave cavity 60 are encased within an insulation layer 64 while within the cavity the components to be heated are transported through the furnace by means of a roller transport system 66. The microwave energy is then coupled to the cavity by means of a so called "leaky wave-guide" 68.

This arrangement of 'hot wave guides' has particular benefits in a continuous processing system in that the microwave power distribution can be controlled to suit the process in hand. For example, higher power densities can be delivered to those regions where fast firing or a critical phase transformation involving a significant volume change is taking place. Very high powers can be attained while the arrangement itself is inherently reliable and easy to maintain during continuous operation.

As an alternative to electric resistance heating it will be apparent that this form of heating could be replaced by gas radiant heating in either a direct, or indirect, burner configuration. In the first case the burners would simply be directed onto the work pieces while in the second, the combustion would take place within a suitable tube of metal or ceramic and would be isolated from the work pieces. Indirect combustion heater tubes have already been developed having the desired properties for operation within a microwave furnace. For example the hot wave guide applicator could incorporate an indirect heating arrangement whereby the cavity forms the radiant heater. In such an arrangement the combustion chambers would then form an integral part of the cavity. Furthermore, it has also been shown to be possible to provide direct gas radiant heating for although the microwaves did interact with the torch flame and with the carbon particles, volumetric heating was still observed.

Whether the furnace be one suitable for batch processing or for processing on a continuous basis, it will be apparent to those skilled in the art that each may be adapted for use with either an inert, a reducing, or even an oxidising atmosphere. Thus, for example, the furnace might find use in the preparation of ceramic superconductors where it is common to "oxygenate" bulk superconductors in an enhanced oxygen-containing atmosphere.

Finally the maximum temperature of use is determined only by the heating source and the materials of construction of the furnace, e.g. the insulation. Temperatures in excess of 2500° C are therefore achievable under the correct control and operating conditions.

I claim:

1. A method of processing ceramic materials comprising the steps of providing a microwave ceramic processor furnace of the type comprising a microwave source, an enclosure for the confinement of microwave energy and for containing a ceramic object to be heated to sintered temperatures, means for coupling the microwave source to said enclosure, and independently controllable alternate heating means comprising at least one of radiant and convective heating means, said alternate heating means being disposed in relation to said enclosure to provide at least one of radiant and convective heat within the enclosure, energizing said alternate heating means independently of the microwave energy in the enclosure so as to generate said at least one of the radiant and convective heat substantially throughout a heating cycle of the furnace needed for sintering the ceramic object and at temperatures up to and including sintering temperatures, and controlling a quantity of heat generated in the object by the microwave energy, and simultaneously controlling a quantity of heat generated in the object by, said at least one of the radiant and convective heat so as to provide a desired thermal profile in the object throughout the heating cycle of the furnace to thereby reduce thermal stresses.

2. A method in accordance with claim 1, wherein the quantity of heat generated by said alternate heating means and supplied to the object to be heated substantially balances the quantity of heat lost by the object by means of surface heat loss mechanisms.

3. A method in accordance with claim 1, wherein the quantity of heat generated by said alternate heating means and supplied to the object to be heated is less than that required to substantially balance the quantity of heat lost by the object by means of surface heat loss mechanisms.

4. A method in accordance with claim 1, wherein the quantity of heat generated by said alternate heating means and supplied to the object to be heated is greater than that required to substantially balance the quantity of heat lost by the object by means of surface heat loss mechanisms.

5. A method in accordance with claim 1, wherein the step of controlling the quantities of heat generated in the object by the microwave energy and said at least one of the radiant and convective heat comprises measuring the ambient temperature within said enclosure and controlling the heat generated in the object by at least one of the microwave energy and said at least one of the radiant and convective heat in response to said temperature measurement.

6. A method in accordance with claim 1, wherein the step of controlling the quantities of heat generated in the object by the microwave energy and said at least one of the radiant and convective heat comprises determining the net quantity of microwave energy per unit time that is delivered to said enclosure and controlling the heat generated by at least one of the microwave energy and said at least one of the radiant and convective heat in response to said determination.

7. A method in accordance with claim 1, wherein the desired thermal profile is provided by adjusting the quantity of heat generated in the object by said at least one of the radiant and convective heat relative to that calculated to have been generated by the microwave energy.

8. A microwave furnace for processing ceramic materials comprising a microwave source, an enclosure for the confinement of microwave energy and for containing a ceramic object to be sintered, means for coupling the microwave source to said enclosure, alternate heating means comprising at least one of radiant and convective heating means controllable independently of the microwave energy and disposed in relation to said enclosure to provide at least one of radiant and convective heat within the enclosure substantially throughout a heating cycle of the furnace and at temperatures up to and including sintering temperatures, and control means for independently controlling throughout the heating cycle the microwave source and said alternate heating means to control a quantity of heat generated in the object by both the microwave energy and said at least one of the radiant and convective heat so as to provide a desired thermal profile in the object throughout the heating cycle needed to sinter the ceramic object thereby to reduce thermal stresses in the ceramic object during the heating cycle.

9. A microwave furnace in accordance with claim 8 and comprising means to determine a net quantity of microwave energy per unit time delivered to said enclosure, said control means being responsive to said determination to control the quantity of heat generated in the object by at least one of the microwave energy and said at least one of the radiant and convective heat so as to provide the desired thermal profile in the object.

10. A microwave furnace in accordance with claim 8, wherein a quantity of heat generated by said at least one of the radiant and convective heat is controlled relative to a quantity of heat calculated to have been generated by the microwave energy to provide the desired thermal profile in the object.

11. A microwave furnace in accordance with claim 8, wherein the quantity of heat generated by the microwave energy is controlled manually.

12. A microwave furnace in accordance with claim 8, wherein said alternate heating means is disposed externally of said enclosure.

13. A microwave furnace in accordance with claim 8, wherein said alternate heating means is disposed internally of said enclosure.

14. A microwave furnace in accordance with claim 13, wherein said radiant heating means comprises at least one resistive heating element that extends through a wall of said enclosure.

15. A microwave furnace in accordance with claim 14, wherein said heating element is moveable between a first position in which the heating element extends through a wall of said enclosure and a second position in which the heating element is withdrawn from said enclosure.

16. A microwave furnace in accordance with claim 14, wherein said heating element is non-retractably mounted within said enclosure.

17. A microwave furnace in accordance with claim 8, wherein said alternate heating means comprises means for the burning of fossil fuels.

18. A microwave furnace in accordance with claim 17, wherein said means for the burning of fossil fuels comprises a slotted wave-guide.

19. A microwave furnace in accordance with claim 8, wherein the furnace is adapted for use with an inert, a reducing or an oxidizing atmosphere.

20. A microwave furnace in accordance with claim 8 and comprising temperature sensor means to measure the ambient temperature within said enclosed, said control means being response to said temperature measurement to control the quantity of heat generated in the object by at least one of the microwave energy and said at least one of the radiant and convective heat so as to provide the desired thermal profile in the object.

* * * * *

UNITED STATES PATENT AND TRADEMARK OFFICE
CERTIFICATE OF CORRECTION

PATENT NO. : 6,172,346 B1
DATED : January 9, 2001
INVENTOR(S) : Fiona Catherine Ruth Wroe It is certified that error appears in the above-identified patent and that said Letters Patent is hereby corrected as shown below:

Column 13,
Equation 7, please replace with the following equation:

$$I_t = dQ/dt = CdV/dt = i\omega CV = \omega CV \cdot \exp[i(\omega t + \pi/2)] \quad ..(7)$$

Column 14,
Equation 17, please replace with the following equation:

$$\varepsilon_{eff} = \varepsilon'' + \sigma/\omega\varepsilon_0 \quad ........(17)$$

Column 19,
Equation 26, please replace with the following equation:

$$P = \frac{Q_h}{t} = M_a C_p (T - T_0)/t \quad ..........(26)$$

Equation 27, please replace with the following equation:

$$(T - T_0)/t = \frac{0.556 \times 10^{-10} \varepsilon_{eff}^{\cdot} f E_{rms}^2}{\rho c_p} \cdot Cs^{-1} \quad ......(27)$$

Equation 31, please replace with the following equation:

$$\alpha = \omega \left\{ \varepsilon_0 \mu_0 \left[ k' \Big/ 2\left(\sqrt{1 - k''^2 \Big/ k'^2} - 1\right) \right] \right\}^{1/2} \quad ..........(31)$$

UNITED STATES PATENT AND TRADEMARK OFFICE
CERTIFICATE OF CORRECTION

PATENT NO. : 6,172,346 B1
DATED : January 9, 2001
INVENTOR(S) : Fiona Catherine Ruth Wroe It is certified that error appears in the above-identified patent and that said Letters Patent is hereby corrected as shown below:

Columnn 22,
Line 39, please replace with the following line:

-- with $\varepsilon''_{eff}$ now equal to that of the glass. --

Column 28,
Line 30, cancel "enclosed" and replace with -- enclosure --.
Line 31, cancel "response" and replace with -- responsive --.

Signed and Sealed this

Fifth Day of February, 2002

JAMES E. ROGAN
*Director of the United States Patent and Trademark Office*

*Attest:*

*Attesting Officer*